United States Patent [19]

Scherr

[11] 4,289,095
[45] Sep. 15, 1981

[54] PREHEATER FOR AIRCRAFT ENGINES

[76] Inventor: Ronald R. Scherr, 505 Little Broadway, Lemay, Mo. 63125

[21] Appl. No.: 54,848

[22] Filed: Jul. 5, 1979

[51] Int. Cl.³ .................... F16K 11/00; B60H 1/04
[52] U.S. Cl. ..................... 123/142.5 R; 123/142.5 E; 123/556; 137/625.47; 137/625.23; 251/149.6
[58] Field of Search ............ 123/142.5 R, 142.5 E, 123/556; 137/625.47, 625.23; 251/149.6

[56] References Cited

U.S. PATENT DOCUMENTS

| | | | |
|---|---|---|---|
| 1,593,795 | 7/1926 | Cassette | 137/625.23 |
| 1,840,784 | 1/1932 | McMillan | 123/625.23 |
| 1,862,114 | 6/1932 | Gilly | 123/142.5 R |
| 2,414,214 | 1/1947 | Spackman | 123/142.5 R |
| 2,548,528 | 4/1951 | Hansen | 251/149.6 |
| 3,022,738 | 2/1962 | Krate | 137/625.23 |
| 3,170,667 | 2/1965 | Szohatzky | 251/149.6 |
| 3,397,684 | 8/1968 | Scherenberg | 123/142.5 R |
| 3,721,265 | 3/1973 | Hoffland | 137/625.47 |
| 3,853,270 | 12/1974 | Prebil | 123/142.5 R |

OTHER PUBLICATIONS

Advertising Sheet from Hunter and Co., Heating Division.

Primary Examiner—Charles J. Myhre
Assistant Examiner—R. A. Nelli
Attorney, Agent, or Firm—Glenn K. Robbins

[57] ABSTRACT

A preheater for aircraft engines utilizing as a source of thermal energy hot water from an automobile. The preheater is comprised of a portable housing having a radiator through which hot water from an automobile engine is circulated. A fan in the preheater energized by an electric motor having leads attached to the battery terminals of the car battery pulls air through the radiator of the preheater and is heated and then discharged by the blower fan through hot air ducts which are inserted in the air intake or nose wheel opening of small aircraft to heat the engine and oil sump in cold weather and facilitate the starting. The preheater is provided with a special valve which is inserted in the car and has a three-way position interrupting the hot water hoses to the car heater from the car radiator and a return hose to the pump. By the special valving the circulation can be made to run through the car only, through the car and the aircraft preheater and lastly to the aircraft preheater only to provide a variety of control. The preheater can then be switched from one car to another as long as the cars are provided with the special valve and quick connect coupling.

17 Claims, 20 Drawing Figures

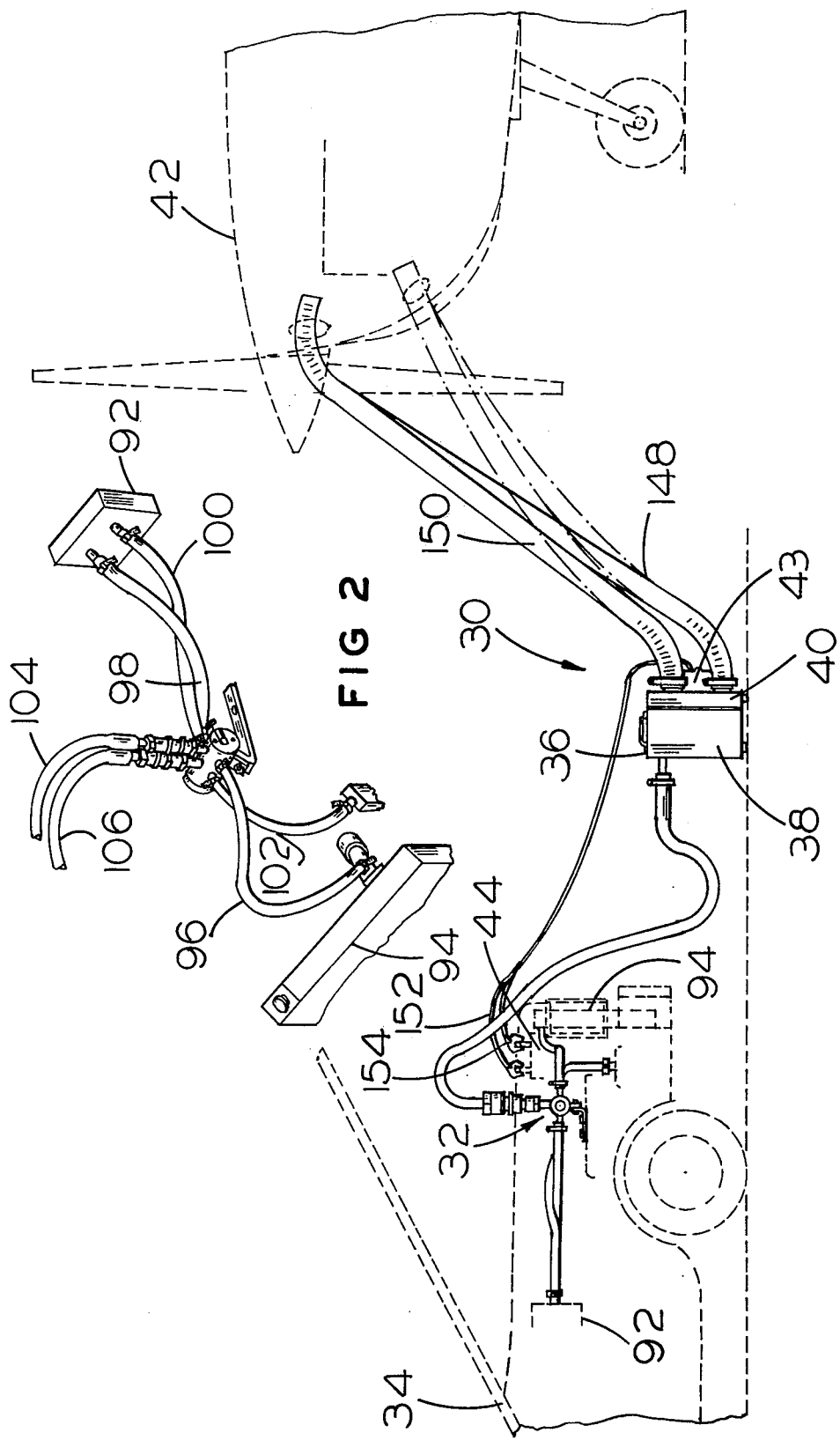

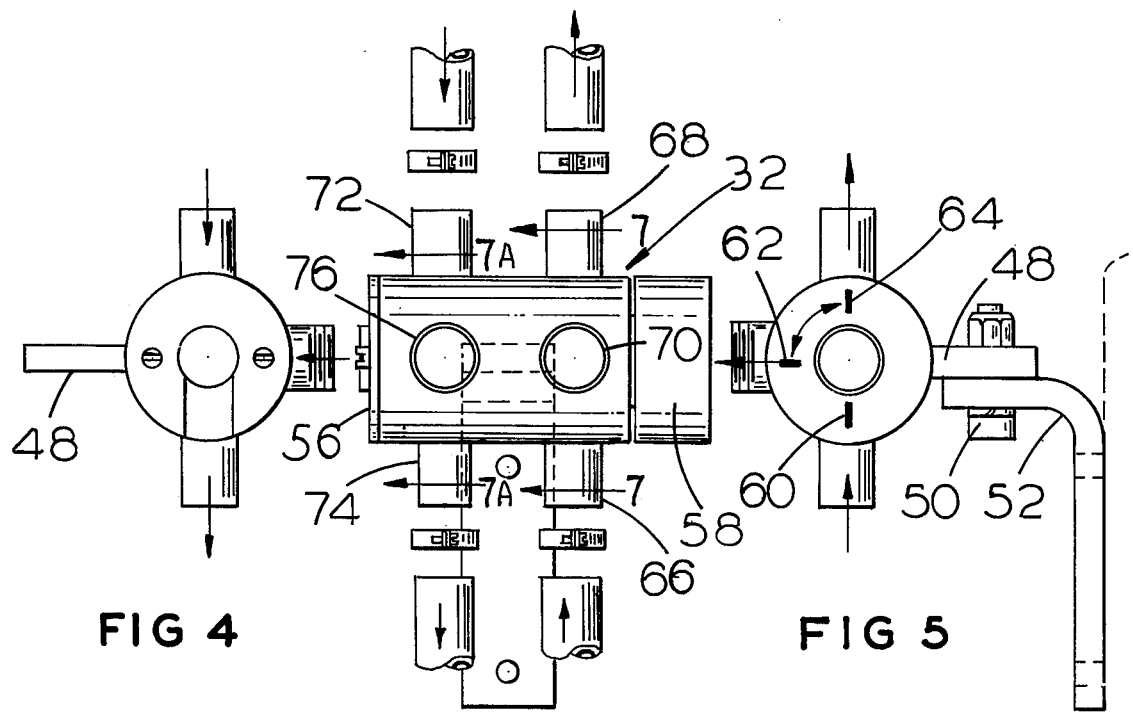
FIG 4   FIG 3   FIG 5
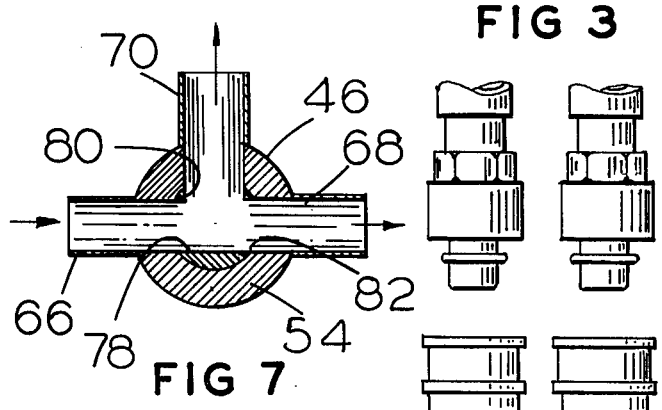
FIG 7
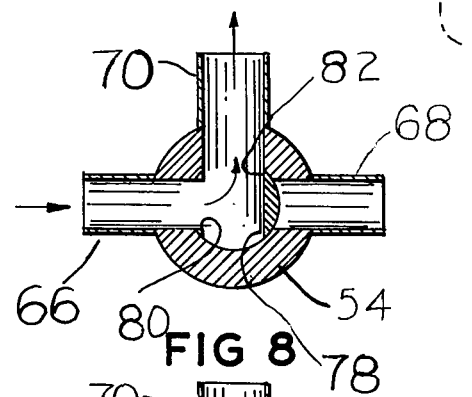
FIG 8
FIG 9
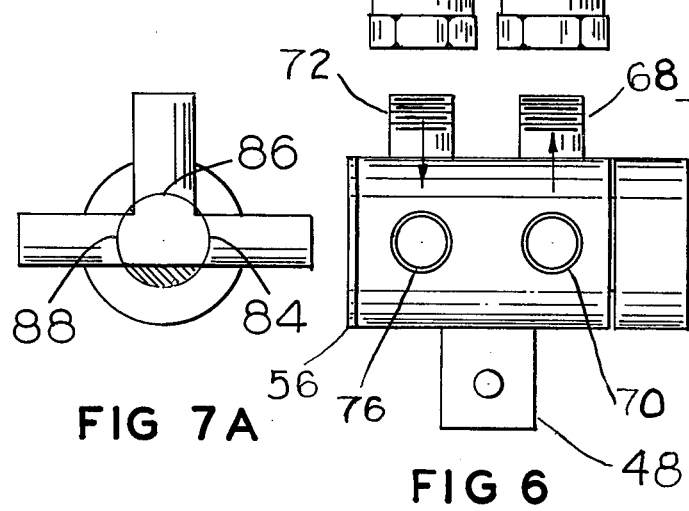
FIG 7A   FIG 6

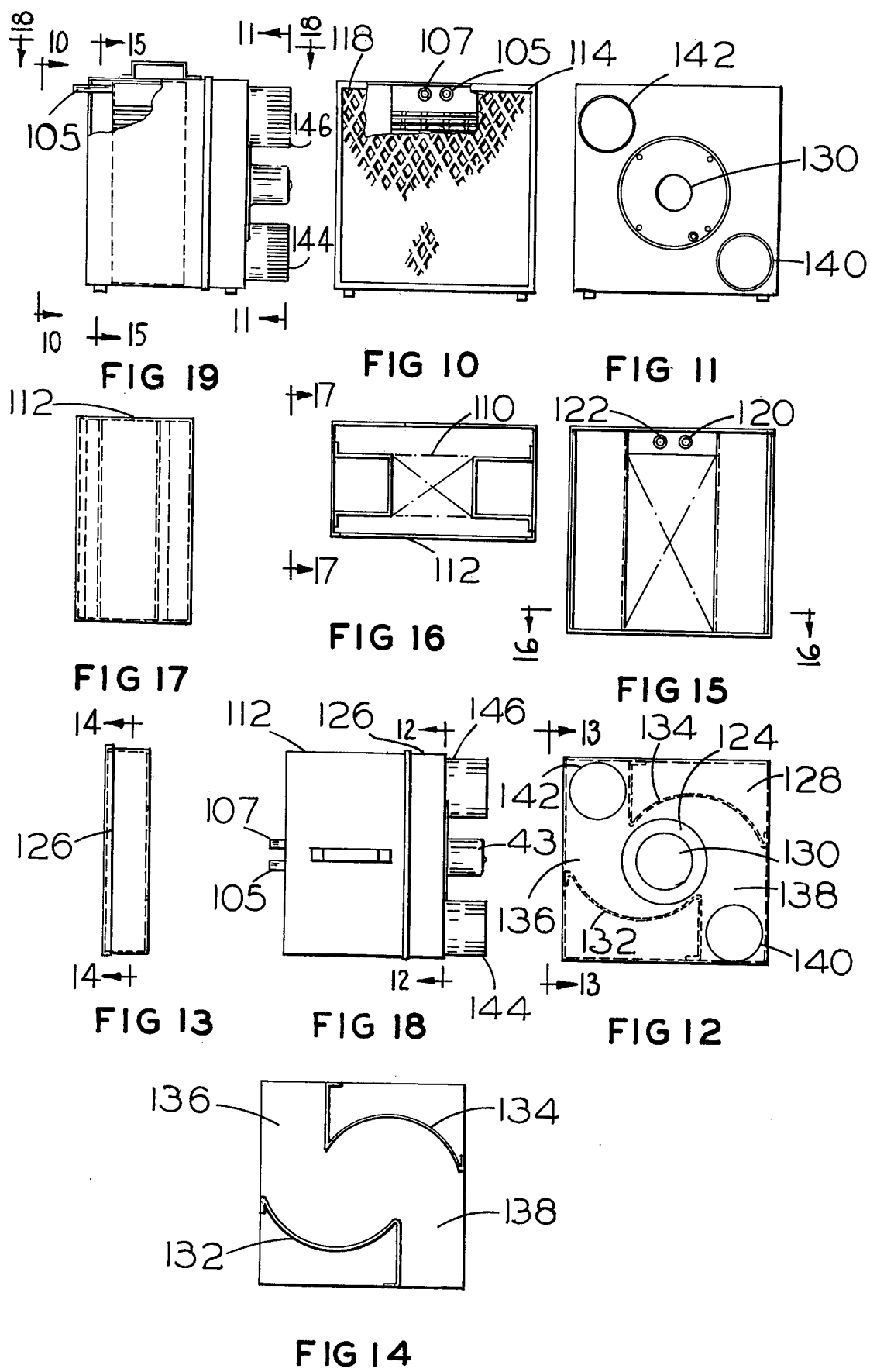

4,289,095

PREHEATER FOR AIRCRAFT ENGINES

SUMMARY OF THE INVENTION

It has long been a problem in the aviation field when cold weather is encountered to start the engine of the aircraft due to the high viscosity of lubricants and difficulty of turning the engine over. While the large international and commercial airports where large aircrafts are serviced may have specially designed mobile self-contained heaters for providing heat to aircraft it has long been a problem to start small aircraft where such large heaters are not available or where expense makes their use prohibitive. Additionally, it frequently occurs that self contained heaters designed mainly for large aircraft provide excessive temperatures which frequently damage plexiglass windshields of smaller aircraft. Such need particularly has existed in small airports, flying clubs and other areas where only a few small aircraft or even one aircraft may be hangered. Here the cost of a self-contained preheater is a prohibitive expense.

By means of this invention there has been devised a portable preheater which can be carried in a car and can be hooked up with a special valve which may be installed in one or more cars. By quick connect and disconnect hosing the self-contained preheater can be hooked into the hot water radiator and heater hosing within a conventional water cooled automobile. By means of a special valve which may be carried in one or a number of cars the preheater can be switched from one car to another and used as desired to preheat small aircraft.

The preheater is simple and rugged in design and uses a conventional radiator through which the hot water from the automobile servicing it is caused to circulate. Air is drawn in from the outside environment by an electric blower from which the source of energy is provided by leads leading from the motor driving the blower to the battery post of the car battery. The blower draws air past the radiator causes it to be heated and drawn into a plenum from which it is blown through large flexible air hoses to the air intake port or nose wheel opening of the aircraft to be preheated. After the aircraft engine and oil sump is heated to sufficient degree to reduce the viscosity to facilitate the turning over of the engine and ease the start, the preheater can be simply removed using no tools and stored in a car trunk.

The preheater of this invention makes use of a specially designed three position valve which is rugged in construction and simple to operate. The valve is designed to interrupt the flow both of the water hose leading from the automobile radiator to the car heater and the return line from the car heater to the conventional water pump. These hose lines are simply interrupted and connected to inlets and outlets of the special valve. A separate outlet for both the hot water line and the return line then leads by flexible hosing to the preheater radiator to provide a source of hot water for heating the aircraft preheater. The preheater and its hoses are separately charged with anti-freeze to prevent starving the coolant in the car.

The valve has three positions and is designed to direct the flow for the hot water line leading from the car radiator to any one of three selected positions. In the first position the flow is to the car heater only, the second position directs the flow both to the car heater and to the aircraft engine preheater and a third position directs the flow only to the port leading to the aircraft preheater. This valving is coordinated with the valving from the return line from the car radiator such that the three positions are synchronized. Thus the first position would correspond to a return from the car heater to the automobile water pump, the second position being from the car heater to the water pump and a return from the aircraft preheater and a third position where the direction of flow for the return line is only from the engine preheater to the automobile water pump. A control dial is provided for the selector valve in order that the operator can simply turn the valve member to the desired position with a special indicating means indicating visually the direction of flow.

The valve is very simply designed and can be connected inside an engine compartment of the automobile in a simple matter. The hosing by conventional quick connect and disconnect couplings provides for ready reception of the hosing to the aircraft preheater which greatly facilitates the switching of the preheater from one automobile to another as long as they are all provided with the selector valve. Further, the selector valve may itself be simply switched from one car to another where desired.

The above features are objects of this invention and further objects will appear in the detailed description which follows and will be otherwise apparent to those skilled in the art.

For the purpose of illustration of this invention, there is shown in the accompanying drawings a preferred embodiment thereof. It is to be understood that these drawings are for the purpose of example only, and that the invention is not limited thereto.

IN THE DRAWINGS

FIG. 1, is a pictorial view showing the connection of the preheater to an automobile and to an aircraft engine.

FIG. 2, is a fragmentary top plan view showing the valving connection between the car heater and radiator and the preheater.

FIG. 3, is a top plan view of the preheater selector valve.

FIG. 4, is a view in end elevation of the valve taken from the the left end of FIG. 3.

FIG. 5, is a view in end elevation of the valve taken from the right end of FIG. 3, and showing the connection to an element of the automobile body.

FIG. 6, is a view in front elevation of the valve.

FIG. 7, is a view in section taken on the line 7—7 of FIG. 3, showing the hot water inlet porting when the valve is turned to the "Both" position to provide heat to both the car and the preheater.

FIG. 7a, is a view in section taken on the line 7a—7a showing the hot water discharge or return porting when the valve is turned to the "Both" position.

FIG. 8, is a view taken similarly to FIG. 7, but showing the valve turned to the "Preheater" position to provide heat only to the preheater.

FIG. 9, is a view taken similarly to FIG. 7, but showing the valve turned to the "Car" position to provide heat only to the automobile engine.

FIG. 10, is a view in front elevation of the preheater showing the air intake screen.

FIG. 11, is a view in rear elevation showing the hot air discharge ducts.

FIG. 12, is a view in elevation of the rear of the plenum chamber.

FIG. 13, is a view in side elevation of the plenum chamber taken from the left side of FIG. 12.

FIG. 14, is a view in section taken on the line 14—14 of FIG. 13.

FIG. 15, is a view in vertical section taken on line 15—15 of FIG. 19 through the middle of the radiator.

FIG. 16, is a view in section taken on line 16—16 of FIG. 15.

FIG. 17, is a view in side elevation of the radiator compartment.

FIG. 18, is a top plan view of the radiator.

FIG. 19, is a view in side elevation of the preheater taken from the right side of FIG. 10.

DESCRIPTION OF THE INVENTION

The aircraft preheater of this invention is generally identified by the reference numeral 30 in FIG. 1. It is comprised of a selector valve 32 mounted at the engine of a car 34 and is connected by suitable hosing to a preheater housing 36. The preheater is comprised of a radiator section 38 and a fan blower section 40 for blowing hot air through hot air hoses or ducts to an aircraft 42. An electric fan 43 in the blower section 40 is connected by suitable wires and clamps to battery 44 of the automobile.

The selector valve 32 is best shown in FIGS. 3 through 9. It is comprised of a valve housing 46 to which a bracket arm 48 is welded for connection by a suitable bolt 50 to a support member 52 suitably connected to a suitable structure of the automobile.

The valve housing is tubular in nature and receives therein a cylindrical valve member 54. The valve member is adapted to be attached to a back plate 56 which bears against the end of the valve housing and at the other end an enlarged selector or control dial 58 is provided which is contiguous with the valve housing and forms a continuation thereof to provide symmetry and ease in operation. The control dial member 58 is provided for visual lineup with the valve ports to determine whether the hot water flow is directly to the car heater, the aircraft preheater, or a combination of the car heater and the aircraft preheater.

In order to provide for interruption of the heater hoses in the car and to provide hookup for passing hot water from the car radiator to the aircraft preheater a series of ports are provided. The hot water inlet to the car heater is adapted to be broken into and serviced to the aircraft preheater by an inlet port 66. This provides for reception of hot water from the car radiator and by means of diametrically opposed port 68 the hot water can be sent to the car heater. Positioned at 90 degrees to each of these ports is port 70 which is adapted to provide hot water to the aircraft preheater.

In order to provide for the hot water return from the car heater and also the aircraft preheater a similar series of ports to that just described is provided. Thus port 72 is adapted to receive the hot water discharge from the car heater through diametrically opposed port 74 to pass the hot water return line to the car water pump and back to the radiator. Port 76 at the top of the valve is located at 90 degrees intermediate the aforementioned ports and is adapted to receive the hot water return line from the aircraft preheater.

As will be best seen by an examination of the FIGS. 7, 8, and 9 the valve member 54 is provided with three valve port openings 78, 80 and 82 which are adapted to be aligned in various degrees of registration with the valve ports. As shown in FIG. 7 the direction of flow from the hot water inlet to the car radiator is provided through the valve to the car heater through port 68 and also to the aircraft preheater through port 70 while FIG. 8 shows the direction of flow only to the car heater.

FIG. 7a is a view taken similarly to FIG. 7 but shows the hot water return line porting in the valve. Thus the valve member is provided with valve opening 84, valve opening 86 and valve opening 88. In the position of the valve that is shown in FIG. 7a these ports are aligned with hot water charge ports 78, 80 and 82. It will be understood that for FIGS. 8 and 9 these ports will assume the same position as described for the hot water inlet lines to provide the proper valving synchronization for the hot water return lines from the car heater the aircraft preheater and back to the car water pump and radiator for complete circulation and reheating.

It will be noted that the three marking indicia 60, 62 and 64 on the selector dial of the valve member as shown in FIG. 5 are coradial with the valve ports 78, 80, and 82. Thus, when the valve member is turned by the selector dial to the "Both" position shown in FIG. 7 the indicia on the dial to indicate the flow direction and it can be seen that the flow will be from the car radiator to the car heater and the preheater. When the selector dial is turned to change the valve porting the indicia thus indicates the direction of flow. This is a great convenience and provides a ready determination of the alignment.

The installation of the valve of this invention in the car is best shown in FIG. 1.

The selector valve 32 is shown in FIGS. 1 and 2 installed in a car 34. The car is equipped with a conventional car heater 92 and a radiator 94. A hot water line 96 leading from the radiator to the car heater is interrupted and provided with conventional quick connect and disconnect couplings in order that it may be connected to ports 66 and 68 of the selector valve which are also provided with this type of coupling. When the selector valve is desired to be removed the two sections of the hot water inlet hose 96 and 98 are connected to each other.

Hot water discharge or return hoses 100 and 102 are connected between the car heater and the water pump when the selector valve is not in use and the two sections are simply connected to each other by the conventional quick connect and disconnect couplings. When the selector valve is installed the intermediate ends of the hoses 100 and 102 are connected to the hot water return ports 72 and 74 respectively in the selector valve. These ports likewise are provided with quick connect and disconnect couplings.

In order to provide for the introduction of the hot water from the selector valve to the preheater hot water hose 104 having a quick connect and disconnect coupling is connected to the selector valve port 70 at one end and to a nipple 105 on the preheater 38 at the other end. Likewise a hot water return hose 106 having the quick connect and disconnect couplings is connected at one end to the hot water return nipple 107 on the preheater at one end and to the hot water return port 76 of the selector valve at the other end.

The preheater 36 is best shown in FIGS. 11-17. It is comprised of a box-like housing having as its main sections the radiator or heat exchanger section 38 and a blower and fan section 40. The preheater section 38 is comprised of a radiator core 110 supported with a radiator housing 112 which is of a box-like construction. A screen housing 114 has a grid-like screen 118 which protects the radiator section. In order to provide hot water to the radiator the nipple 105 is connected to an inlet port 120 is provided while an outlet port 122 is situated adjacent it for connection to nipple 107.

The blower section 40 is comprised of electric motor 43 connected to a conventional squirrel-cage blower 124 mounted within a plenum section 126. The plenum section as best shown in FIGS. 12, 13, and 14 is comprised of a partition wall 128 having an opening 130 which communicates with the radiator and permits ambient air to be sucked through the screen 118, past the radiator core 110 into the plenum chamber by the blower. The plenum chamber is provided with wall sections 132 and 134 which act as baffles and direct the heated air to passages 136 and 138, respectively. Ports 140 and 142 communicate as shown in FIG. 11 with hot air discharge nipples 144 and 146. These nipples are adapted to receive flexible air ducts or hoses of large diameter, 148 and 150 as best shown in FIG. 1. These ducts at their free ends are adapted to be connected into the air intake ports or nose wheel opening for the aircraft engine to provide heat thereto.

In order to provide an electric source to energize the electric motor 43, electrical leads 152 and 154 provided with alligator clamps or other conventional clamps are utilized to clamp to the battery post terminals of the car battery 44 to provide a convenient source of electrical energy. Thus, the complete source of thermal energy and electrical energy required to operate the preheater is supplied by the operator's automobile.

USE

The aircraft preheater of this invention is very simply adapted for use for heating small aircraft engines to the point where the lubricant system is heated to a ready flow condition where the aircarft engine can be readily started. This system is particularly well adapted for members of a flying club or other type of organization where a number of people might desire to use a single preheater with each car being provided with their own separate selector valve. In this fashion a single preheater can be simply connected by hosing wih quick connect to the ports of the selector valve of the automobile and the electrical leads can be clamped to the battery.

The preheater can after the simple connections be used in an obvious fashion after the engine of the car has been started and comes up to heat to provide hot water circulating through the selector valve and to the radiator core of the preheater. The outlet air hoses of the preheater are simply interfitted into the air intake ports or nose wheel openings in the aircraft engine to direct heated air to the oil sump and the engine. After a few minutes the aircraft engine and oil sump is suitably warmed to the point where the engine will turn over readily. In this fashion the problem of starting in severe cold and damage to the engine is greatly minimized.

It will be understood that the car operator may stay in the car while the radiator of the car is being heated by turning the selector or control dial to the "Car" position where only a portion of the heat is needed in the car the operator may turn the selector valve to the "Both Position" to provide the hot water both to the car heater and also to the aircraft preheater. Alternately, as desired, all of the hot water may be diverted by appropriate turning of the selector valve to the "Preheater" position where all the hot water is delivered to the aircraft preheater and then through the selector valve to the car radiator.

In the installation of the selector valve in the car the only interruption into the car heater hose system itself is the provision of two sections, 96 and 98, from the radiator to the car heater rather than the single line formerly used. These two sections are provided with the simple quick connect and disconnect coupling of conventional manufacture to provide for connection of the two hoses to one another as desired or to the selector valve when the selector valve is installed. Likewise, the hot water return lines, 100 and 102 are made in two sections with provisions for quick connect and disconnect to each other and to the selector valve.

The selector valve itself is adapted to be very simply mounted in the car engine compartment by the bracket. After the selector valve has been appropriately mounted the hoses are connected to the ports for the hot water inlet and outlet lines and the ports leading to the preheater are connected by means of quick connects to the hoses 104 and 106. The only other connections required are the connections of the battery cable lines 152 and 154 leading from the electric motor of the preheater to the battery terminals of the car. The outlet hot air hoses 148 and 150 from the preheater are then appropriately installed or connected to the air inlet intakes in the aircraft 42 or the nose wheel opening as desired.

The preheater is then ready for use. The car, if it has not been running is first brought up to heat by operating the engine for a few minutes to provide sufficient heat to the hot water circulated through the system. Where it is desired first of all to heat the car heater, the selector or control dial is turned to the "Car" position shown in FIG. 10 to direct the flow of the hot water directly through the selector valve from the car radiator to the car heater with the port to the preheater being locked. After sufficient time has elapsed to provide heat to the car heater the operator may desire to continue the heat to the car heater while also providing heat to the aircraft preheater. The selector dial is then turned to the "Both" position shown in FIG. 8 to provide heat both to the car heater and also to the aircraft preheater.

When sufficient heat has been provided to the car or no further heat in the car is needed all of the output thermal energy may be diverted to the aircraft preheater when the selector valve is turned to the "Preheater" position shown in FIG. 9. This delivers all the hot water directly to the aircraft preheater and returns it to the selector valve and from there to the water pump.

It will be apparent that by the selector valve and aircraft preheater of this invention there has been provided a highly effective aircraft preheater which can be used with conventional automobiles. Further, the adaptability of use to provide heat both to the automobile to ensure comfort of the users and also to the aircraft preheater gives a dual use that is quite advantageous in cold and very severe weather. The selector valve may be shifted from car to car or used by a number of individuals each having their own selector valve with exchange being provided for the more costly and bulky aircraft preheater depending on its desired placement and usage. In this manner only one aircraft preheater need be used by a number of individuals and even a small airport need have only one such preheater with one or more selector valves as needed.

Various changes and modifications need be made within this invention as will be readily apparent to those skilled in the art. Such changes and modifications are within the scope and teaching of this invention as defined by the claims appended hereto.

What is claimed is:

1. A preheater for aircraft engines to facilitate cold weather starting which comprises a preheater housing having a radiator means receiving hot engine coolant fluid therein, hose means for passing said hot fluid from an automobile engine heater system to said radiator and returning said fluid to said automobile engine heating system, blower means in said preheater housing for passing ambient air through said radiator to heat said air and forcing said heated air through ducts adapted to be directed to said aircraft engine to warm the engine and its lubrication systems to reduce the viscosity of the lubricant in said system, the blower means being powered by an electric motor and the source of electrical power being provided by electrical leads having means connecting said leads to the battery of the automobile, a selector valve means being provided in said automobile intermediate a first hot water inlet hose leading to the automobile heater and intermediate a second hot water outlet hose leading from the automobile heater, said selector valve means being further provided with ports adapted to be connected to said hose means passing to said perheater radiator and means are provided for removably connecting hose means to said valve ports, said hose means and radiator being filled with an engine coolant compatible with the engine coolant in said automobile, said hose connecting means automatically closing the ends of said hoses when they are removed from said valve ports whereby the preheater housing and hosing may be readily transferred to another automobile provided with said selector valve means.

2. The preheater of claim 1, in which the preheater housing is portable and is comprised of a radiator section having an inlet and outlet means adapted to be connected to said hose means and a blower section, said blower section having a transverse wall section forming a common boundary with said radiator section and provided with an opening for passage of heated air from the radiator section to said blower section.

3. The preheater of claim 2, in which said blower means comprises a squirrel cage blower member mounted in said blower section and baffle means directing heated air to an outlet in said housing communicating with said ducts.

4. The preheater of claim 3, in which said baffle means enclose said squirrel cage blower member and form a pair of diametrically opposed tangential outlets communicating with said ducts.

5. The preheater of claim 1, in which said selector valve means is removably mounted on said automobile and has means removably connecting it to said hoses of said automobile engine heater system.

6. The preheater of claim 5, in which the hose means of said automobile engine comprises a pair of removably connected together hose members comprising said first hot water inlet line leading from an automobile radiator to an automobile heater and a second pair of hose members removably connected together comprising said second hot water return line leading from said heater to a water pump in said automobile forming a part of the automobile heating system and said selector valve is removably connected between said pairs of said first and second hose members.

7. The preheater of claim 1, in which said selector valve means has operating means for directing the flow of said hot water inlet in three selected directions, a first direction being to the automobile heater, the second direction being to the aircraft preheater and the third direction being to both the automobile heater and the aircraft preheater.

8. The preheater of claim 7, in which said selector valve means is provided with indicating means for indicating the selected direction of flow.

9. The preheater of claim 7, in which said selector valve means has operating means for directing the flow of said hot water outlet in three selected directions synchronized with the flow of said hot water inlet, a first direction being from the automobile heater, the second direction being from the aircraft preheater and the third direction being from both the automobile heater and the aircraft preheater.

10. The preheater of claim 9, in which said valve means comprises a cylindrical valve housing, a cylindrical valve member coaxially supported for relative rotation within said housing, said housing having a pair of inlet and a pair of outlet ports adapted to be connected intermediate said first hot water inlet hose and said second hot water outlet hose, respectively, said pairs of ports being coradial and said housing being further provided with coradial inlet and outlet ports adapted to be connected to an inlet and outlet hose passing to said preheater radiator constituting said preheater hose means, said valve member is comprised of coradial valve ports selectively adapted to communicate with said pairs of housing ports and said aircraft preheater ports.

11. The preheater of claim 10, in which said valve member is further provided with a handle means comprised of a disk-like member, said handle means having radially extending indicating means coradial with said aforementioned valve ports for indicating selected alignment of said valve ports with said housing ports.

12. The preheater of claim 1, in which said selector valve means comprises a cylindrical valve housing, a cylindrical valve member coaxially supported for relative rotation within said housing, said housing having a pair of inlet and a pair of outlet ports adapted to be connected intermediate said first hot water inlet hose and said second hot water outlet hose, respectively, said pairs of ports being coradial and said housing being further provided with coradial inlet and outlet ports adapted to be connected to an inlet and outlet hose passing to said preheater radiator constituting said preheater hose means.

13. The preheater of claim 12, in which said valve member is comprised of coradial valve ports selectively adapted to communicate with said pairs of housing ports and said aircraft preheater ports.

14. The preheater of claim 13, in which said valve member is further provided with a handle means comprised of a disk-like member, said handle means having radially extending indicating means coradial with said aforementioned valve ports for indicating selected alignment of said valve ports with said housing ports.

15. An auxiliary heating device having means for receiving hot engine coolant fluid therein as a source of heat, hose means for passing said hot fluid from an automobile engine heater system to said device and returning said fluid to said automobile engine heating system, selector valve means provided in said automobile intermediate a first hot water inlet hose leading to the automobile heater and intermediate a second hot water outlet hose leading from the automobile heater, said selector valve means being further provided with ports adapted to be connected to said hose means, said selector valve means comprising a cylindrical valve housing, a cylindrical valve member coaxially supported for relative rotation within said housing said housing having a pair of inlet and a pair of outlet ports adapted to be connected intermediate said first hot water inlet hose and said second hot water outlet hose, respectively, said pairs of ports being coradial and said housing being further provided with coradial inlet and outlet ports adapted to be connected to an inlet and outlet hose passing to said auxiliary heating device.

16. The preheater of claim 15, in which said valve member is comprised of coradial valve ports selectively adapted to communicate with said pairs of housing ports and said auxiliary heating device ports.

17. The preheater of claim 16, in which said valve member is further provided with a handle means comprised of a disk-like member, said handle means having radially extending indicating means coradial with said aforementioned valve ports for indicating selected alignment of said valve ports with said housing ports.

* * * * *